United States Patent
Coleman

(10) Patent No.: US 7,717,691 B2
(45) Date of Patent: May 18, 2010

(54) TIRE MOLD WITH VENT INLET DISPOSED UNDER MOLD RIB

(75) Inventor: Richard E. Coleman, Brentwood, TN (US)

(73) Assignee: Bridgestone Americas Tire Operations, LLC

(*) Notice: Subject to any disclaimer, the term of this patent is extended or adjusted under 35 U.S.C. 154(b) by 80 days.

(21) Appl. No.: 12/131,156

(22) Filed: Jun. 2, 2008

(65) Prior Publication Data

US 2008/0305195 A1 Dec. 11, 2008

Related U.S. Application Data

(60) Provisional application No. 60/942,064, filed on Jun. 5, 2007.

(51) Int. Cl.
B29C 33/10 (2006.01)
(52) U.S. Cl. .................. 425/28.1; 425/46; 425/470
(58) Field of Classification Search ............. 425/28.1, 425/35, 46, 470
See application file for complete search history.

(56) References Cited

U.S. PATENT DOCUMENTS

| | | | |
|---|---|---|---|
| 2,679,663 A | 6/1954 | Schwemler et al. | |
| 3,901,632 A | 8/1975 | Prosdocimi | |
| 4,553,918 A | 11/1985 | Yoda et al. | |
| 4,576,559 A * | 3/1986 | Yoda et al. | 425/28.1 |
| 4,708,609 A | 11/1987 | Yoda et al. | |
| 4,957,676 A | 9/1990 | Greenwood | |
| 5,340,294 A | 8/1994 | Kata | |
| 5,585,064 A | 12/1996 | Moris-Herbeuval et al. | |
| 6,196,818 B1 | 3/2001 | Coleman et al. | |
| 6,200,118 B1 | 3/2001 | Lopez et al. | |
| 6,382,943 B1 | 5/2002 | Metz et al. | |
| 6,454,554 B1 | 9/2002 | Lopez et al. | |
| 6,808,376 B2 | 10/2004 | Serener-Thielmann | |
| 2002/0162941 A1 | 11/2002 | Hanya | |

FOREIGN PATENT DOCUMENTS

KR 10-2003-0029739 A 4/2003
KR 10-2005-0098063 A 10/2005

OTHER PUBLICATIONS

Korean Intellectual Property Office, PCT International Search Report, Nov. 14, 2008, p. 8, Korean Intellectual Property Office, Seo-gu, Daejeon, Republic of Korea.
Ellen Moyse, International Preliminary Report on Patentability and Written Opinion, Application No. PCT/US08/007010, Dec. 17, 2009, pp. 1-6, The International Bureau of WIPO, Geneva, Switzerland.

* cited by examiner

Primary Examiner—James Mackey
(74) Attorney, Agent, or Firm—Thomas R. Kingsbury; Fred Zollinger

(57) ABSTRACT

A die rib for a tire mold defines the inlets to vent passages of the mold through the sides of the die ribs so that the vent passages do not open through the contour surface of the mold. In one exemplary configuration, the invention provides a die rib having a vent inlet disposed along at least one side of the die rib. The vent inlet may be disposed along up to 80 percent of the length of the die rib with at least one foot disposed against the contour surface of the tire mold section.

16 Claims, 4 Drawing Sheets

TIRE MOLD WITH VENT INLET DISPOSED UNDER MOLD RIB

CROSS REFERENCE TO RELATED APPLICATIONS

This application claims the benefit of provisional patent application Ser. No. 60/942,064 filed Jun. 5, 2007; the disclosures of which are incorporated herein by reference.

BACKGROUND OF THE INVENTION

1. Technical Field

This invention relates generally to tire manufacturing molds, and more particularly to a tire manufacturing mold having vent passages that do not open through the contour surface of the mold used to form the tire tread. Specifically, the invention relates to a tire manufacturing mold having vent passages with inlets defined under portions of the die ribs that overhang the contour surface so that the vent passage inlets are not disposed in the contour surface of the tire mold.

2. Background Information

Tire manufacturing molds have gas vents leading away from the mold contour surface to remove the gas trapped within the mold during the tire molding process. Tire surface quality is degraded if the gas is not properly vented. Tire rubber can enter these vents to form undesirable flash on the resulting tire tread. The gas vents can also clog with the tire material leading to expensive downtime when the mold must be cleaned.

BRIEF SUMMARY OF THE INVENTION

The invention provides a die rib for a tire mold. The die ribs define the inlets to the vent passages of the mold through the sides of the die ribs so that the vent passages do not open through the contour surface of the mold.

In one exemplary configuration, the invention provides a die rib having a vent inlet disposed along at least one side of the die rib. The vent inlet may be disposed along up to 80 percent of the length of the die rib with at least one foot disposed against the contour surface of the tire mold section.

In another exemplary configuration, the invention provides a die rib having vent inlets disposed along both sides of the die rib. The vent inlets may be disposed along up to 80 percent of the length of the die rib with at least one foot disposed on each side of the die rib. The feet are disposed against the contour surface of the tire mold section.

In a further exemplary configuration, the invention provides a die rib having vent inlets disposed along both sides of the die rib. Each end of each vent inlet is bounded by a foot that is disposed against the contour surface of the tire mold section.

The invention also provides the combination of a tire mold section and a die rib wherein the combination of the die rib and the tire mold define a vent passage inlet that is not in the contour surface of the tire mold section. In one configuration, the invention provides a combination wherein the inlet to the vent passage is defined in the side of the die rib.

The invention also provides a tire mold with a plurality of die ribs disposed in circumferential longitudinal grooves defined by the mold. The combination of the die ribs and the tire mold sections define vent passage inlets that are not open through the contour surfaces of the tire mold sections. In one configuration, the invention provides a tire mold having vent passages wherein the inlets to the vent passages are defined in the side of the die rib.

The invention also provides vent inlets in any of the configurations described above that are configured to avoid clogging. In one configuration, the invention provides a truck and bus tire mold having a plurality of mold sections that carry a plurality of die ribs. A plurality of the die ribs define vent passage inlets through the sides of the die ribs. Each inlet has a height of 0.0015 inches (0.0381 mm) so that the truck and bus tire compound will not clog the vent passage inlets during molding.

The invention also provides a method of venting tire mold gas through inlets defined under the overhanging portions of the die ribs.

BRIEF DESCRIPTION OF THE SEVERAL VIEWS OF THE DRAWINGS

Similar numbers refer to similar parts throughout the specification.

DETAILED DESCRIPTION OF THE INVENTION

Figure 1:
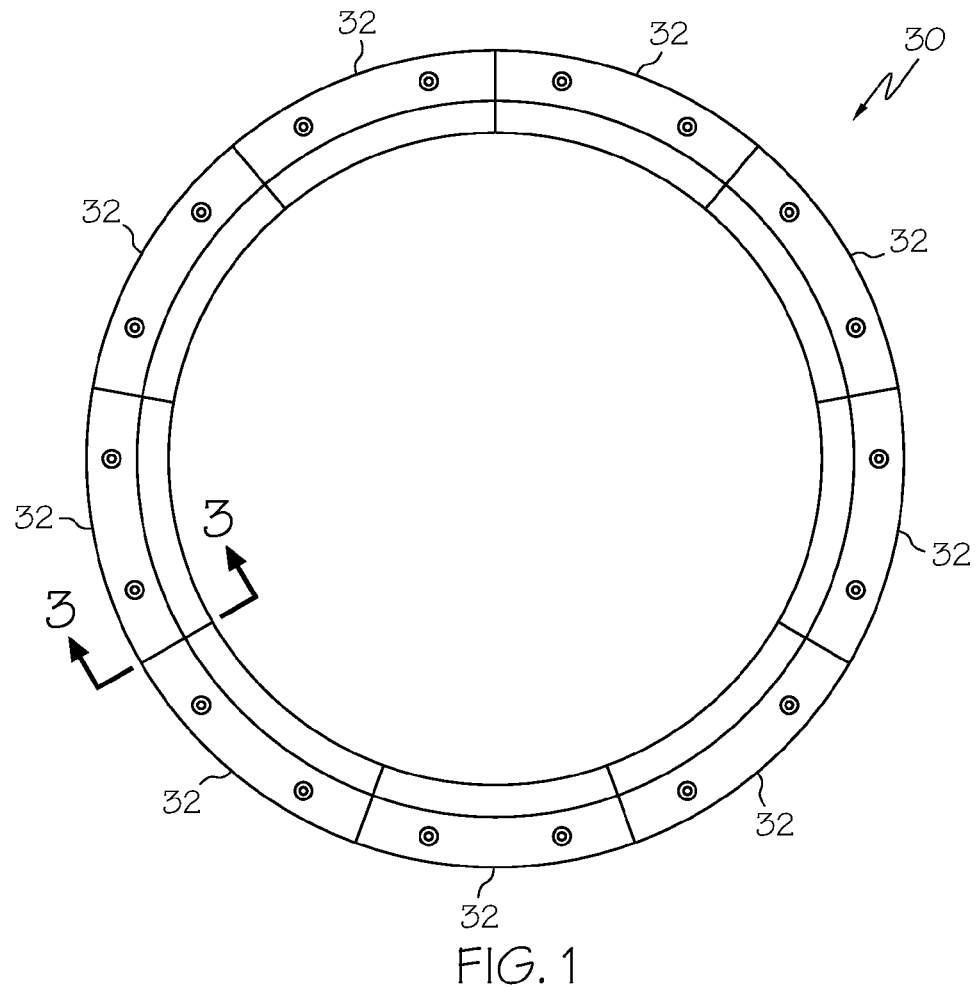
FIG. 1 is a view of an exemplary tread-forming mold for a pneumatic tire.
Figure 3:
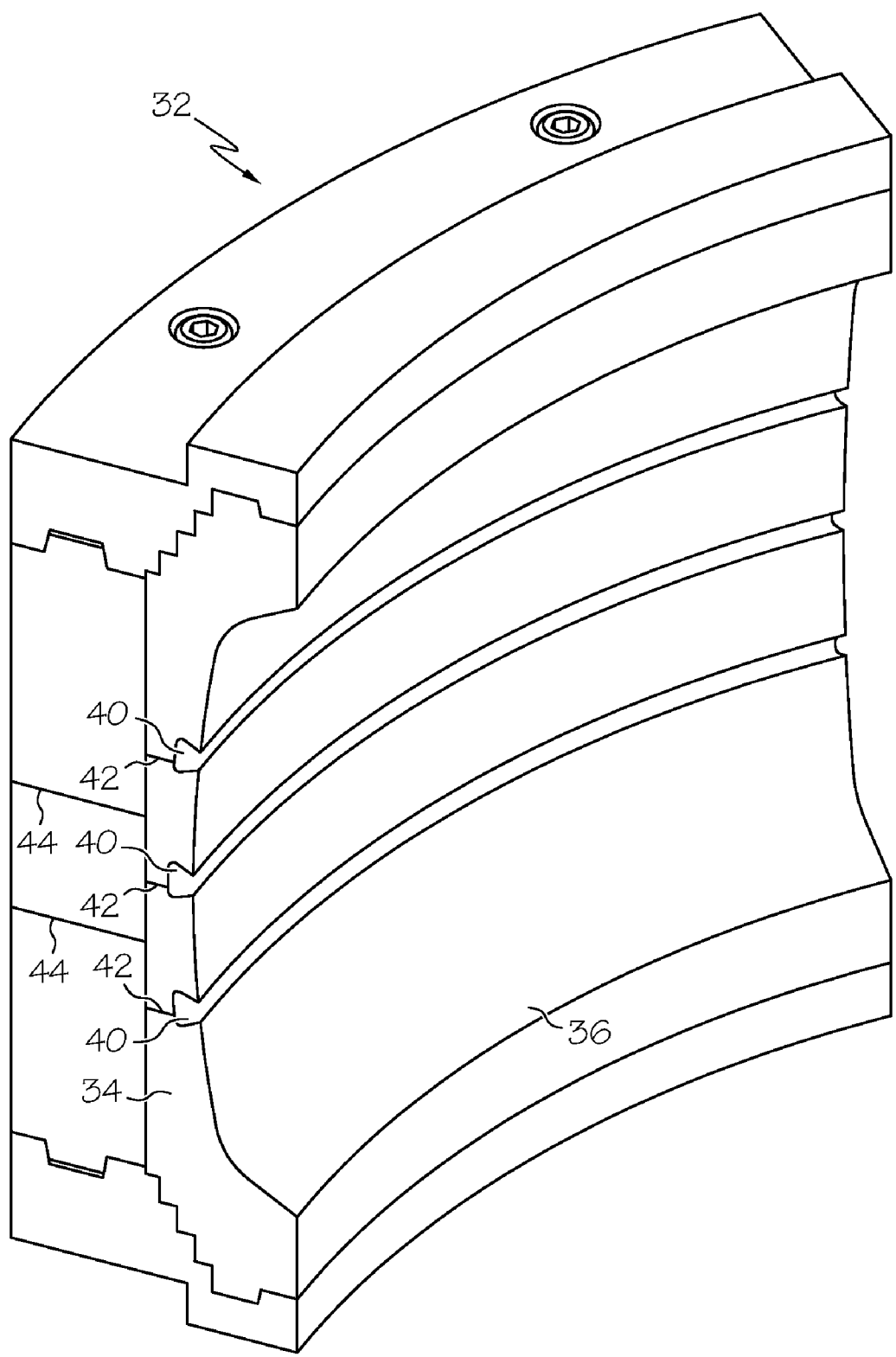
FIG. 3 is a perspective view of a single mold section from the exemplary mold of FIG. 1 showing exemplary dovetailed grooves that receive the die ribs.
Figure 4:
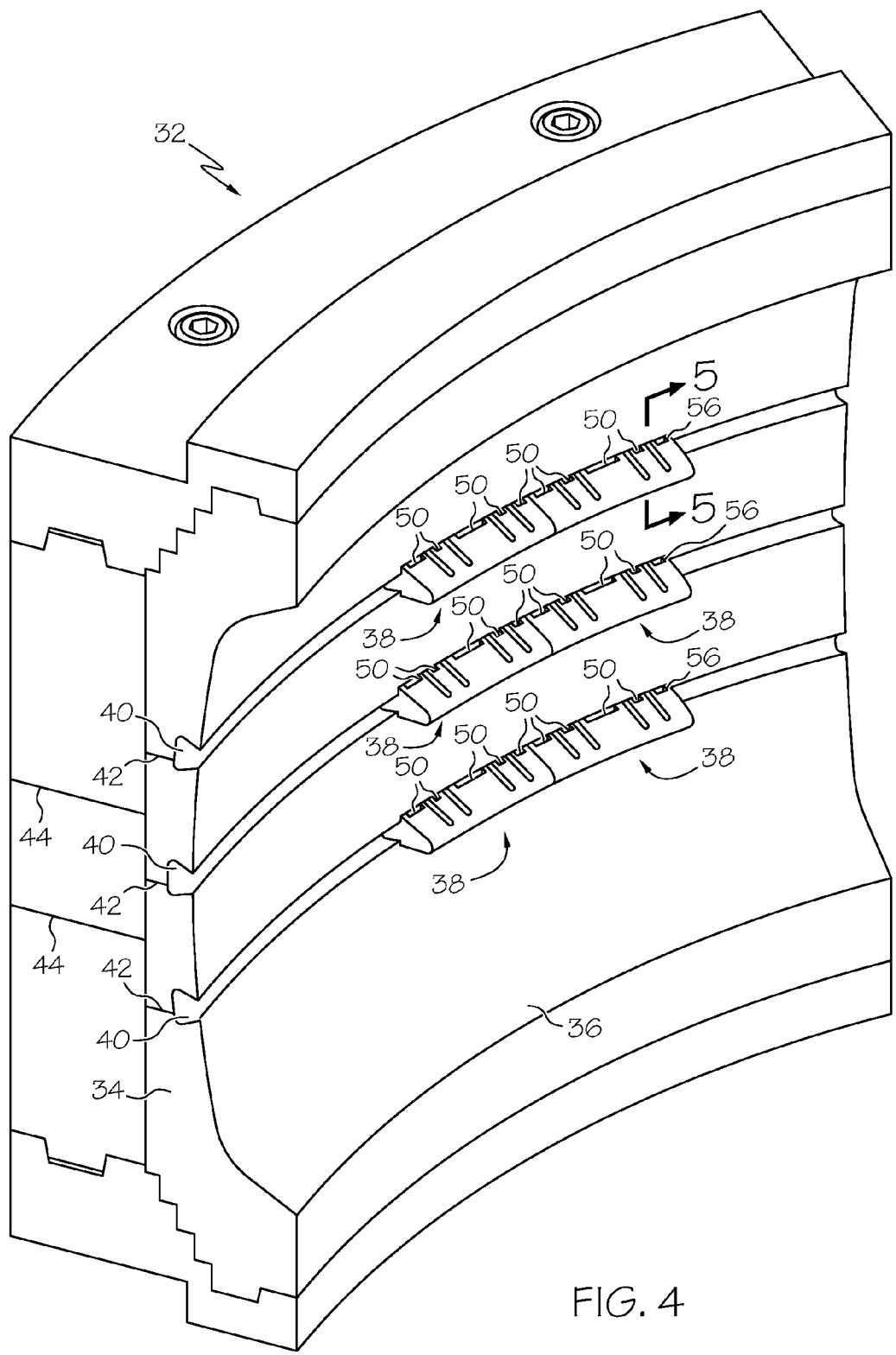
FIG. 4 is perspective view of the exemplary mold section of FIG. 3 with a plurality of the die ribs of the present invention installed in the mold section.

An exemplary pneumatic tire mold is indicated generally by the numeral 30 in FIG. 1. Exemplary tire mold 30 includes a plurality of individual mold sections 32 that cooperate to form an annular mold. Each mold section 32 (FIG. 3) includes a body 34 having an inner contour surface 36. A green tire is pressed against inner contour surfaces 36 of mold sections 32 of tire mold 30 to impart the shape of tire mold 30 to the green tire being molded. Tire mold 30 is thus provided with a plurality of die ribs 38 as depicted in FIG. 4 to impart a tread pattern to the green tire being molded.

Each die rib 38 is received in a circumferentially extending longitudinal groove 40 that is defined by body 34 of mold section 32. In the exemplary configuration depicted in the drawings, each longitudinal groove 40 in body 34 is configured to form an interference fit with a die rib 38 in a direction substantially perpendicular to the longitudinal direction of groove 40. The exemplary interference fit is a dovetail. Die ribs 38 may also be secured with connectors such as wedges and bolts.

A vent passage 42 is in fluid communication with each groove 40. These passages 42 may be vented to the outside of mold 30 with a common vent passage 44. Other vent passage configurations may be used.

Figure 2:
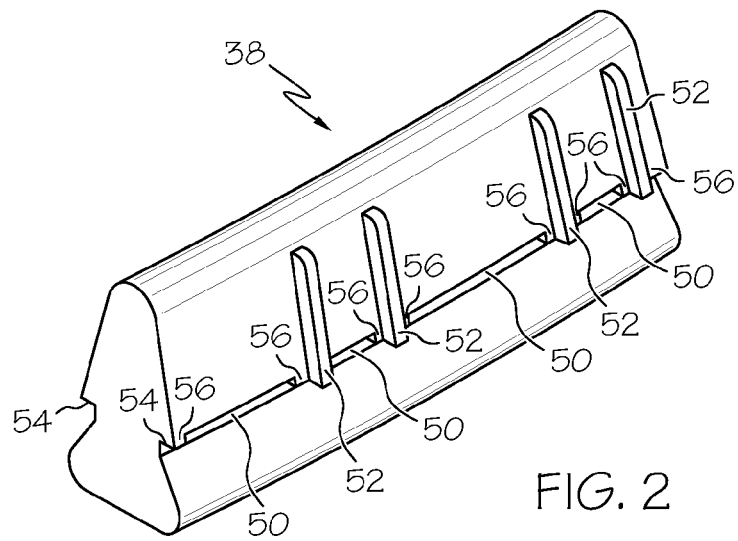
FIG. 2 is an enlarged perspective view of an exemplary single die rib with the vent openings defined through the sides of the die rib.
Figure 5:
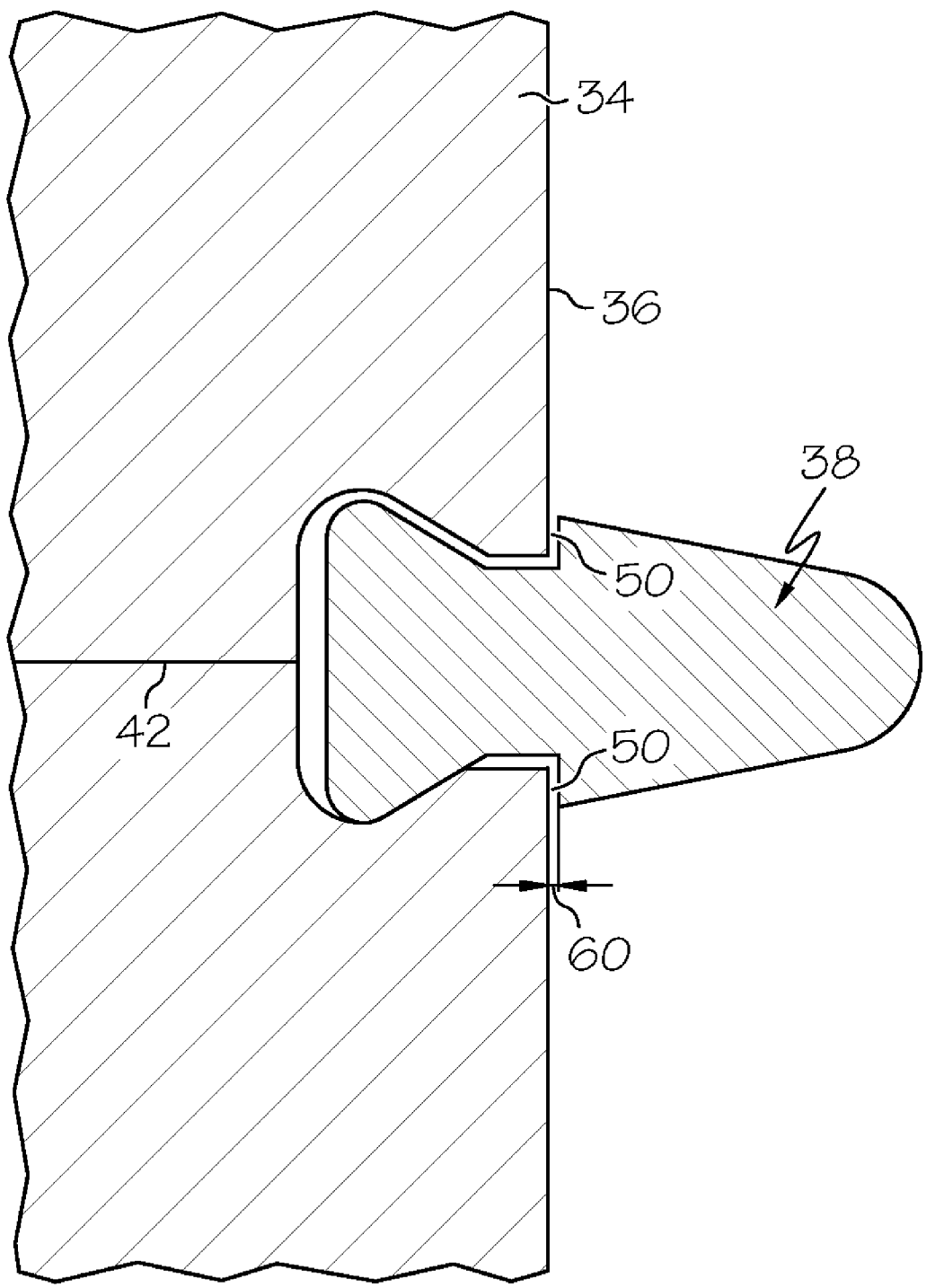
FIG. 5 is a section view taken through one of the vent inlets in the die rib taken along line 5-5 of FIG. 4.

FIG. 2 depicts the die rib vent inlets 50 that allow mold gases to be vented out of mold 30 during the tire molding process. At least one vent passage inlet 50 is defined on at least one side of die rib 38. In the exemplary embodiment, a plurality of inlets 50 are defined on both sides of rib 38 at the overhang 54 that extends over the contour surface 36 of body 34. Each inlet 50 may be 0.0015 inch high (0.0381 mm) with a tolerance of +/−0.0003 inches (0.00762 mm) as depicted in FIG. 5 by reference numeral 60. Along one side of rib 38, the combined lengths of inlets 50 is no more than 80 percent of the overall length of die rib 38. Inlets 50 of this size are small enough to prevent rubber compounds for truck and bus tires from clogging inlets 50 while being large enough to vent mold 30. The specific size of inlet 50 depends on the type of material being used in mold 30 and the size of mold 30 compared to the number of die ribs 38. Feet 56 engage surface 36 to maintain the position of rib 38.

This configuration allows mold gas to be drawn in through inlet 50, into groove 40, and into passage 42. Inlets 50 are small enough to not clog. Further, any material that forms flash in inlet 50 will not be in the outer surface of the tire being molded. The mold gases may pass between the walls that define the groove and the male dovetail of die rib 38. In other configurations, the male dovetail of die rib 38 may define channels to accommodate the mold gases. Such a channel is depicted in FIG. 5.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of the invention is an example and the invention is not limited to the exact details shown or described.

The invention claimed is:

1. A pneumatic tire mold section and die rib for a pneumatic tire mold, comprising:
   a mold section having an inner contour surface;
   the mold section defining at least one groove open through the contour surface of the mold section
   the mold section defining a portion of a vent passage in fluid communication with the groove;
   a die rib at least partially disposed in the groove;
   the die rib having an overhang portion disposed above the contour surface of the mold section; the overhang portion of the die rib defining a vent passage inlet in fluid communication with the vent passage; and
   wherein the die rib overhang portion defines a pair of feet; the vent passage inlet being entirely disposed intermediate the feet; each of the feet engaging the inner contour surface.

2. The device of claim 1, wherein the inlet is 0.0015 inch high.

3. The device of claim 1, wherein the die rib has a length; the inlet having a length that is no more than 80 percent of the length of the die rib.

4. The device of claim 1, wherein the die rib has a pair of overhang portions; each of the overhang portions defining a vent passage inlet.

5. The device of claim 4, wherein each die rib overhang portion defines a pair of feet; the vent passage inlet being disposed intermediate the feet; each of the feet engaging the inner contour surface.

6. The device of claim 1, wherein the die rib has a pair of die rib overhang portions; each of the die rib overhang portions defining a plurality of vent passage inlets.

7. The device of claim 6, wherein each die rib overhang portion defines a plurality of feet; each vent passage inlet being disposed intermediate two feet; each of the feet engaging the inner contour surface.

8. The device of claim 7, wherein the die rib has a length; the inlets on either overhang having a combined length that is no more than 80 percent of the length of the die rib.

9. The device of claim 8, wherein each of the inlets is 0.0015 inch high.

10. The device of claim 1, wherein a cross section of the groove shaped like a female dovetail and the portion of the die rib disposed in the groove has the cross sectional shape of a corresponding male dovetail.

11. The device of claim 10, wherein a portion of the male dovetail defines a channel that provides fluid communication between the vent passage inlet and the vent passage.

12. A die rib for use in a pneumatic tire mold section that has an inner contour surface and at least one groove open through the contour surface of the mold section; the die rib comprising:
   a first portion adapted to be disposed in the groove;
   a second portion adapted to define a portion of the tire to be molded with the die rib;
   the second portion having a pair of overhangs adapted to be disposed over the contour surface on opposite sides of the groove; and
   at least one of the overhangs defining a vent passage inlet and a pair of feet; the vent passage inlet being entirely disposed intermediate the feet.

13. The device of claim 12, wherein the die rib has a length; the inlet having a length that is no more than 80 percent of the length of the die rib.

14. The device of claim 12, wherein each of the overhangs defines a vent passage inlet and a pair of feet; each vent passage inlet being disposed intermediate a pair of feet.

15. The device of claim 14, wherein each of the overhangs defines a plurality of vent passage inlets and a plurality of feet; each vent passage inlet being disposed intermediate two feet.

16. The device of claim 15, wherein the die rib has a length; the inlets on either overhang having a combined length that is no more than 80 percent of the length of the die rib.

* * * * *